United States Patent Office 3,449,450
Patented June 10, 1969

3,449,450
PRODUCTION OF PERCHLOROETHYLENE FROM 1,2-DICHLOROETHANE BY A FIRST STEP CHLORINATION FOLLOWED BY AN OXYCHLORINATION STEP
Lester E. Bohl and Raymond M. Vancamp, New Martinsville, W. Va., assignors to PPG Industries, Inc., a corporation of Pennsylvania
No Drawing. Continuation-in-part of application Ser. No. 28,520, May 12, 1960. This application Feb. 13, 1963, Ser. No. 258,147
Int. Cl. C07c 21/04, 17/10
U.S. Cl. 260—654        5 Claims

ABSTRACT OF THE DISCLOSURE

Perchloroethylene is produced by the vapor phase chlorination of 1,2-dichloroethane in a first step while feeding to the reaction 0.025 to 0.1 mole of oxygen per mole of 1,2-dichloroethane and then subjecting the product of the first step to vapor phase catalytic oxychlorination, the oxygen feed to the first step being such that the quantity of carbon deposited in the oxychlorination step is reduced.

This application is a continuation in part of our copending application, Ser. No. 28,520 filed May 12, 1960, now abandoned.

---

The present invention relates to the production of chlorinated hydrocarbons. More particularly, the present invention relates to the production of perchloroethylene and trichloroethylene by processes involving modified Deacon type chlorination procedures.

Modified Deacon type chlorinations or "oxychlorinations," as they are termed in the art, are beneficial reactions in modern chemical plants which conduct large scale chlorination processes. The attractiveness of these oxychlorination processes is due to the fact that they effectively utilize HCl by-product from conventional, thermal or catalytic chlorination procedures.

"Oxychlorination" as utilized herein in the specification and claims refers to processes in which gaseous hydrogen chloride is utilized as a chlorinating agent. The processes contemplated involve the reaction of gaseous hydrogen chloride, an oxygen containing gas such as air and the hydrocarbon or chlorohydrocarbon to be chlorinated while in contact with the metal halide catalyst. It has been postulated that the HCl in these reactions is oxidized to free chlorine and water and the chlorine reacts with the organic feed to produce a chlorinated hydrocarbon. In another modification of oxychlorination procedures, elemental chlorine is used as the feed gas in place of gaseous hydrogen chloride. This latter process theoretically operates in a manner similar to the first except that an initial chlorination of the hydrocarbon takes place. Thus, free chlorine, an oxygen containing gas and the hydrocarbon or chlorohydrocarbon to be chlorinated are passed in contact with a metal halide catalyst. The chlorine reacts with the hydrocarbon to produce hydrogen chloride and a chlorinated product of the hydrocarbon. Hydrogen chloride produced in this manner is then converted by oxidation to chlorine and water and its chlorine content utilized to achieve additional chlorinations of the hydrocarbon feed material.

In a copending application of Lester E. Bohl et al., U.S. Ser. No. 28,521, a process is described whereby 1,2-dichloroethane is chlorinated to perchloroethylene utilizing in part an oxychlorination procedure. In the process described in the above-identified application, 1,2-dichloroethane and chlorine are reacted together to produce a chlorinated reaction mixture and the mixture so formed is subsequently contacted with a metal halide oxychlorination catalyst maintained at elevated temperatures. Prior to its contact with the metal halide oxychlorination catalyst, this reaction mixture is mixed with oxygen. The process is an effective one for the production of perchloroethylene and trichloroethylene in that maximum utilization of the chlorohydrocarbon and other feed materials are realized. The process further is capable of easy control from a temperature standpoint which represents a considerable advance in the art. Temperature control in reactions of this type is frequently a difficult problem. In addition, a two-step reaction sequence results in a substantial reduction in the burning normally encountered in a single step oxychlorination reaction.

While the process described in the application above referred to represents a substantial advance in the art, certain difficulties are frequently encountered which detract somewhat from its overall desirability. Thus, it has been found in the fixed bed operation of processes of this type with an open tube chlorination that often after a considerable period of time the oxychlorination reaction tends to fall off in efficiency due to the formation within the oxychlorination catalyst bed of solid plugs believed to be elemental carbon. While the exact theory underlying the formation of these plugs is not known, it is believed that pyrolysis occurring in the chlorination reaction introduces solid carbon into the oxychlorination reaction zone. This solid carbon infiltrates the pores of the catalyst carrier and cuts down the efficiency of the catalyst in proportion to the quantity of carbon impregnated in the pores of the carriers. It has been found that quite frequently the carbon formation and deposition in the second step of the above described process, that is, the oxychlorination reaction, on occasions causes a shut down of the entire process due to a considerable pressure build-up across the reactor. Similarly, while burning of feed material has been substantially reduced by a two-step process as described above, it still frequently represents a bothersome problem.

When a packed tube is employed in the chlorination zone, the chlorination zone often becomes plugged with carbon deposits, again probably caused by pyrolysis of the organic feed. Carbon formation in the chlorinator results frequently in carbon formation in the oxychlorination zone due to blowover from the chlorination zone. Carbon formation in either of the zones produces deleterious effects on reaction efficiency and other like considerations.

It has been found in accordance with the present invention that the stepwise production of perchloroethylene from 1,2-dichloroethane, chlorine and oxygen in a fixed bed may be conducted without experiencing any appreciable carbon formation in the oxychlorination reaction step by introducing into the chlorination step a small quantity of oxygen. The oxygen may be introduced as elemental oxygen or as air as desired and the quantity of oxygen fed typically regulated to provide from between about .025 to 0.1 mole of oxygen for each mole of 1,2-dichloroethane fed to the chlorination zone. Burning of organic feed constituents is also reduced in both fixed and fluid bed operation thereby enhancing the process.

In conducting the initial chlorination step in accordance with this invention, elemental chlorine is contacted with 1,2-dichloroethane, preferably in a mole to mole ratio. Thus, normally 1 mole of elemental chlorine is fed to the initial chlorination reaction for each mole of 1,2-dichloroethane fed thereto. If desired, a considerable excess of chlorine may be employed in the initial reaction zone but generally speaking it is preferable to maintain the chlorine ratio such that less than 1.5 moles of chlorine are fed for each mole of 1,2-dichloroethane fed to the reaction zone. Similarly, if desired, a chlorine feed may be maintained in the chlorination zone which is considerably below the mole to mole ratio set forth above as preferred. Thus, if desired, as little as ¼ of a mole of chlorine or less may be fed for each mole of 1,2-dichloroethane fed to the reaction zone.

The term "oxygen containing gas" as used herein in the specification and claims refers to oxygen or any mixtures of gases which are not reactive under process conditions and which contain elemental oxygen therein. Thus, oxygen enriched air, oxygen, or air mixed with inert gases or vapors, or mixtures of oxygen, air, and inert gases or vapors may be conveniently utilized in accordance with the teachings of the present invention without impairing results in any way. In the preferred operation, elemental oxygen is conveniently employed as the oxygen containing gas.

The quantity of oxygen employed in the chlorination zone or chlorination reaction in accordance with the teachings of the instant invention is such that from .025 to 0.1 mole of oxygen are fed for each mole of 1,2-dichloroethane mixed with the elemental chlorine in the chlorination step. Preferably, oxygen fed to the chlorination step is regulated to provide between 0.05 and 0.08 mole of oxygen for each mole of 1,2-dichloroethane fed thereto.

The quantity of oxygen employed in the oxychlorination step, in accordance with this invention, is considerably variable but is generally maintained in a range such that for every mole of dichloroethane and every mole of chlorine fed to the chlorination zone 1 mole of oxygen is employed in the oxychlorination step. While equimolar quantities of oxygen and 1,2-dichloroethane are usually maintained in the overall reaction, it is of course possible to vary this. If desired, as little as 0.25 mole of oxygen may be employed in the oxychlorination zone for each mole of 1,2-dichloroethane fed to the chlorination zone. Similarly, excess oxygen may be employed though excesses above 5 moles of oxygen for each mole of dichloroethane fed to the chlorination zone are usually avoided. Oxygen exceeding the 5 molar quantity generally results in deleterious effects such as excessive oxidation of the chlorinated organics introduced into the oxychlorination zone from the chlorination step. Usually oxygen feed is regulated to provide between 0.5 mole to 2 moles of oxygen per mole of 1,2-dichloroethane employed. In the preferred mode of operation, in accordance with this invention, the oxygen requirement for the oxychlorination reaction is reduced from the 1 molar preferred quantity in proportion to the quantity of oxygen which is fed to the chlorination zone. Generally where 0.1 mole of oxygen is fed to the chlorination zone with the 1,2-dichloroethane and chlorine, 0.9 mole of oxygen is fed to the oxychlorination zone. Operating in this manner, maximum utilization of the organics and chlorinating agents is realized.

Temperatures in the process of the present invention are considerably variable in the individual steps and are conveniently maintained within certain broad limits. Thus, in the initial chlorination reaction between 1,2-dichloroethane and chlorine, temperatures maintained generally within a range of between about 650° F. to 750° F. The preferred operating temperature in this reaction is generally in the range of between 690° F. to 720° F. The temperature of the oxychlorination reaction taking place in the presence of the metal halide oxychlorination catalyst is maintained somewhere between 720° F. to 950° F. A preferred range of operating temperature is from 780° F. to 850° F. With respect to the oxychlorination reaction, the utilization of feed materials is greatly enhanced at the more elevated temperatures though considerable burning of the chlorohydrocarbons fed to this reaction may occur at higher temperatures than at the lower temperatures. Typically in the oxychlorination step, the oxychlorination is conducted at a temperature above about 720° F. and below about 900° F.

Contact times for the reactive materials in the chlorination reaction and the oxychlorination reaction herein above outlined is considerably variable and depends in part on the particular reaction which is taking place. Thus, during the chlorination reaction or in the chlorination zone, the contact between the chlorine and the 1,2-dichloroethane is maintained preferably in a low range. Thus, contact times in this reaction may vary from 0.25 to 5 seconds. Preferably, contact time during the chlorination reaction is maintained at about 2 seconds. Excessive contact times above the upper limits described above in the chlorination reaction are generally to be avoided since the reaction taking place in the chlorination zone will tend to run away at longer contact times.

During the oxychlorination reaction, contact times are regulated so that the reacting gases are maintained within the reaction zone for a period of from 4 to 25 seconds or longer. The oxychlorination reaction contact times, while important, are not as limited as those in the chlorination zone. Thus, during the oxychlorination reaction, contact times considerably above 20 seconds may be employed if desired. As a general rule, the shortest possible contact time which still gives efficient utilization of the oxygen and organic feed materials reacting in the oxychlorination zone is desired and sought. Preferably, therefore, the oxychlorination reaction is conducted somewhere within a range of between 5 and 12 seconds.

It is an important consideration in conducting the process of this invention that control of the reaction occurring in the first zone be realized. The reaction may be controlled by a variety of mechanisms or regulation of any one of several mechanisms. Generally, the reaction occurring in the zone is controlled to the extent that at least 90 percent of the molar quantity of chlorine fed to the zone is utilized and emerges from the zone as a useful chlorination product. Useful chlorination products emerging from this zone are chlorinated hydrocarbons and HCl. Thus, the reaction gases emerging from the chlorination zone generally are maintained by controlling the chlorination reaction taking place therein so that less than 5 percent of the reaction gases removed therefrom are present as elemental chlorine. Preferably, the reaction occurring in the chlorination zone is so controlled that the reaction gases emerging or removed from the zone contain less than 3 percent elemental chlorine on a volume basis.

In order to accomplish the desired control set forth above, contact times, temperatures, and ratios of feed materials to the chlorination reaction are adjusted to provide for the chlorine content in the exit gases issuing from the reaction within the indicated values given. In general, longer contact times in the chlorination reaction tend to utilize more elemental chlorine. In a similar fashion, higher temperatures favor the substitution chlorinations being conducted in the initial chlorination zone. Still further, reductions in the quantity of chlorine fed to the zone below any excess quantities are generally desirable.

Typically, should reaction gases emerging from the chlorination reaction contain too large a quantity of chlorine, that is, a quantity over and above 10 percent by volume, the reactant gases fed to the chlorination reaction may be adjusted by feeding less chlorine for each mole of 1,2 - dichloroethane being fed to the zone or by feeding more 1,2 - dichloroethane for the quantity of chlorine being fed to the zone. At any rate, using the general propositions that longer contact times, higher temperatures, and higher concentrations of chlorine favor more extensive chlorination, the skilled artisan by adjusting the conditions may readily provide for a reaction in the chlorination zone which will produce a mixture containing elemental chlorine within the desired range.

Since considerable heat is evolved in both the chlorination and the oxychlorination reaction conducted herein, some means should be provided with any reactor employed for cooling the reactions or zones of reactions thereby to obtain a temperature control over these reactions or reaction zones. Such control is achieved readily by suitable jacketing of reactors, spraying of coolants into reaction zones, by the insertion of coils into the reaction beds, by the use of bayonet coolers in the reactors, or by recourse to other similar type heat exchange apparatus which may be conviently operated in connection with fixed or fluid bed reactors. Effective utilization of such heat exchange equipment gives rise to a ready control of the temperature of the reactions taking place within the beds.

Preferably, where a fixed bed operation is contemplated, a tubular reactor is employed having an internal diameter somewhere between ¼ inch and 6 inches. Operation with fixed beds greater in diameter than the 6 inch limitation are found to be undesirable due to the relative inability of commercially available equipment to remove heat from such a reactor. Similarly, operation with tubes smaller than the ¼ inch size is economically unattractive and necessitates the use of extremely small carrier particles for the catalyst.

The catalyst employed for the oxychlorination of the reaction product from the chlorination zone may be any well known oxychlorination or Deacon type catalyst. Generally, catalyst of this type are metal halides, preferably chlorides of a multivalent metal such as copper, iron, chromium, and the like. These metal halides or chlorides may be utilized alone or may be combined with other metals such as alkali metal chlorides and alkaline earth metal chlorides or mixtures thereof.

Any effective Deacon type metal halide catalyst will satisfactorily produce perchloroethylene from the products being fed to the oxychlorination zone. A preferred catalyst for this reaction is a copper chloride-zinc chloride-calcium chloride mixed catalyst. It has also been found that a particularly effective catalyst for this operation is a copper chloride-potassium chloride catalyst. Preferably, the catalyst employed is one which contains some quantity of copper chloride thereon.

A multitude of various carriers may be employed in conducting these reactions and materials such as silica, alumina, fuller's earth, kieselguhr, pumice, and other like materials may be employed. The selection of a particular type of carrier will depend in part, of course, upon the type of bed operation contemplated for the oxychlorination reaction. Typically, for a fixed bed operation, a particularly effective carrier material has been found in Celite (a Lompoc, Calif. diatomite manufactured by the Johns-Manville Corporation). This material impregnated with a copper chloride-potassium chloride mixed catalyst has been found effective in fixed bed operations. Celite, impregnated with a copper chloride-zinc chloride-calcium chloride mixed catalyst has also been found to be a very effective catalyst for conducting the oxychlorination reaction contemplated in accordance with the teachings of this invention. For fluid bed applications, a particularly effective carrier for the copper chloride-potassium chloride mixed catalyst and/or for the copper chloride-calicum chloride-zinc chloride catalyst is Florex (a treated fuller's earth manufactured by the Floridin Corporation).

The oxychlorination reaction is conducted in the vapor phase at elevated temperatures and it is preferable in operating this reaction that all materials entering the reaction zone be in the vapor state.

In conducting a vapor phase first step chlorination, 1,2-dichloroethane and chlorine are preferably fed to a tubular reactor which is heated to the desired reaction temperature. This is conveniently accomplished by circulating in a jacket surrounding the reactor a suitable heat exchange material such as boiling Dowtherm (a eutectic mixture of diphenyl and diphenyl oxide manufactured by the Dow Chemical Company) under pressure. Preferably, the tubular reactor employed is packed with inert materials such as ceramic Raschig rings, Berl saddles, glass beads, inert catalyst carrier material such as Celite or any other material inert to the reactants being fed to the zone but having sufficient heat carrying capacity to impart rapidly to the gases fed therein their contained heat. If the first stage chlorination is conducted in a fluid bed operation, the reactants are of course merely fed to an inert fluidized bed of materials such as unimpregnated carrier particles, sand, and other similar material having good heat transfer capabilities.

Reaction products from the oxychlorination reaction are comprised of various chlorinated organic derivatives of 1,2-dichloroethane, such as perchloroethylene, trichloroethylene, pentachloroethane, hexachloroethane, vinyl chloride, dichloroethylenes, in addition to considerable quantities of water, gaseous HCl, CO and $CO_2$ Generally, the organic products from such reaction are condensed and/or absorbed and after purification and water removal steps following the conventional practices, of the art, the desired perchloroethylene and trichloroethylene are separated from other chlorinated organics by fractional distillations, selective absorption and desorption operations or other like separation processes.

In conducting the overall operation of the process of the instant invention, 1,2-dichloroethane, and chlorine are mixed together and reacted in a reaction zone at elevated temperatures. To the mixture of 1,2-dichloroethane and chlorine reacted in this initial chlorination zone is introduced a quantity of oxygen representing between 0.025 and 0.1 mole of oxygen for each mole of 1,2-dichloroethane being fed thereto. By jacketing the reactor and the circulating a boiling Dowtherm heat transfer medium therein under pressure in the jacket, the temperature in the reaction zone is maintained between 650° F. and 750° F.

Reaction products issuing from the chlorination of the 1,2-dichloroethane and chlorine in the presence of the small quantity of oxygen fed therewith are introduced into a reactor containing therein a fixed metal halide oxychlorination catalyst bed. The oxychlorination reactor is maintained with a bed temperature of between 720° F. to 950° F. To the reactant gases admitted to the oxychlorination zone is introduced an oxygen containing gas in a quantity sufficient to produce perchloroethylene from the chlorohydrocarbons being fed thereto. Conveniently the quantity of oxygen containing gas fed to the oxychlorination zone is sufficient to provide a mole of oxygen for each mole of 1,2-dichloroethane fed to the chlorination zone. Maintenance of oxygen levels within this range will successfully produce perchloroethylene product.

For a more complete understanding of the present invention, reference is made to the following examples which are illustrative of the methods which may be conveniently employed to conduct the process in accordance with this invention:

Example I

One hundred ten and eight-tenths grams of copper chloride, $CuCl_2 \cdot 2H_2O$, 34 grams of zinc chloride, $ZnCl_2$ and 30 grams of calcium chloride, $CaCl_2$, were dissolved in 200 milliliters of water at ambient temperature (70° F.). The chloride salts were thoroughly mixed with the water until they were compeltely dissolved. The solution, upon completion of the dissolving operation of the chlorides contained 0.65 mole of $CuCl_2 \cdot 2H_2O$, 0.25 mole of $ZnCl_2$ and 0.27 mole of $CaCl_2$. One thousand milliliters of cylindrical celite pellets ¼ inch in diameter and approximately ¼ inch in length were placed in a rotating tumbler. The rotating tumbler was actuated and the metal chloride solution prepared above was sprayed onto the pellets while they were rotating in the tumbling device. The pellets, upon completion of the mixing operation, were air dried in baking dishes placed in an oven at 100° C.

Example II

Two tubular reactors were assembled and placed together to provide for the chlorination of 1,2-dichloroethane and chlorine. The first stage reactor comprised a nickel tube 1½ inches in internal diameter and having an overall length of 11 feet. This tube was jacketed with a steel jacket over its entire length and was packed throughout 10 feet of its length with unimpregnated Celite pellets cylindrical in shape and having dimensions ¼ inch by ¼ inch. The jacket of the reactor was filled with Dowtherm, a heat exchange medium. The second reactor consisted of 3 nickel tubes having internal diameters of 1½ inches each. Each of the tubes was 11 feet long and contained in each tube was a catalyst bed throughout 8 feet of the length of each tube. The catalyst prepared as in Example I was employed in each of the catalyst tubes. The second oxychlorination reactor was jacketed with an 8 inch internal diameter steel Dowtherm jacket.

Chlorine fed to the first stage of the reactor was introduced to the reactor by passage from a cylinder through a rotameter and then to a mixing T located in front of the inlet to the chlorination reactor or first stage reactor. 1,2-dichloroethane being fed to the chlorination or first stage reactor was passed through a steel vaporizer having a steel jacket surrounding it and heated with steam under 175 pounds square inch gauge pressure. The exit pipe from the vaporizer terminated at the mixing T and a single pipe from the mixing T is introduced into the top of the chlorination reactor which is placed in a vertical position. A Dowtherm reflux condenser is connected to the upper portion of the jacket on both reactors and electric strip heaters are placed on the outside of the jackets at the lower portions thereof for heat control. The Dowtherm refluxing in the condenser and jackets of the reactors is under pressure. The oxygen fed to the system is introduced with the chlorinated organic into the mixing T. Gases issuing from the chlorination reactor issue from the bottom and are introduced into the bottom of the oxychlorination reactor. Oxygen introduced into the oxychlorination reactor is passed through a rotameter and introduced into the bottom of the oxychlorination reactor with the products issuing from the chlorination reactor. Reactant gases emerging from the oxychlorination reactor are passed through an impervious graphite shell and tube heat exchanger and through a Dry Ice-acetone cold bath. Vent gases issuing from the cold trap are passed through a packed column scrubber in countercurrent contact with water and muriatic acid formed being removed from the bottom thereof. The remainder of the vent gases are passed through a wet test meter and/or such analyzing apparatus.

Utilizing the apparatus as described above, 1 mole of dichloroethane, 1 mole of chlorine and 0.367 mole of air (oxygen 0.077 mole) were passed through the vaporizer and introduced into the top of the chlorination reactor. The jacket temperature was regulated at 621° F. and the bed temperature control to about 720° F. The velocity of the gases passed through the chlorination zone was regulated to provide a contact time within the zone of the reactant gases of 3 seconds. The gases emerging from the zone were mixed with 0.757 mole of elemental oxygen and passed into the second stage reactor. The jacket temperature in the oxychlorination reactor was maintained at 714° F. with a bed temperature of 780° F. The velocity of the gases introduced into the oxychlorination reactor was controlled to provide a contact time of 4.2 seconds. The organic products were collected by condensation and analyzed by infra-red and Orsat analysis and the results are listed below in Table I.

TABLE I

Mole percent yield basis the 1,2-dichloroethane fed:

| | |
|---|---|
| $C_2HCl_3$ | 24.0 |
| $C_2Cl_4$ | 34.2 |
| $C_2HCl_5$ | 14.1 |
| $1,1,2,2,C_2H_2Cl_4$ | 10.7 |
| $C_2Cl_6$ | 0.2 |
| $1,2,C_2H_2Cl_2$ | 5.7 |
| $1,2,C_2H_4Cl_2$ | 0.1 |
| $CHCl_3$ and $CCl_4$ | 0.9 |
| Percent organics | 89.9 |
| CO and $CO_2$ | 3.9 |
| Percent $Cl_2$ utilization | 69.5 |

Utilization of the small oxygen feed to the chlorination step of a chlorination-oxychlorination process as described in Example I but utilizing fluid bed operations in the oxychlorination step in place of the fixed bed also results in good utilization of materials fed and low burning of the organic feed employed.

The process, therefore, may be conducted by passing the gaseous reactants at varying velocities upward through beds of finely-divided (catalyst containing) solid particles in a single reactor.

When a gas is passed through a bed of solid material, several different conditions may be established depending upon the gas velocity, size of particles, etc. Thus, if the gas velocity is low, the bed of solids remains static; the gas simply passes through the bed pores. On the other hand, as the gas velocity is increased, at least some of the particles become dynamically suspended in the upwardly rising gas stream. As a result, the bed height expands. Such beds are termed "dynamic beds." If the gas velocity is still further increased, the particles all become suspended and the bed expands even further. Ultimately, the bed may assume a highly turbulent condition which in many ways resembles a boiling liquid. The present process may be conducted with gas velocities that provide for dynamic and fluidized beds. The exact condition requisite to establishing such bed conditions depends upon such factors as the particle size of the bed components, the gas velocity, the density of the particles, etc. Wilhelm and Kwauk, Chemical Engineering Progress, volume 44, page 201 (1948), equate the various factors necessary for fluidizing the bed, and by following the principles therein discussed, the desired bed condition may be provided. Preferably, in the instant process, fluidized beds rather than dynamic beds are employed when fixed bed operation is not desired.

For a more complete understanding of the application of fluid bed techniques to the instant process, reference is made to the following example which is illustrative of one form or mode of operation which may be employed.

Example III

The reactor employed was a nickel pipe 6 feet long and having an internal diameter of 6 inches. The nickel reactor was jacketed with a 10 inch internal diameter Schedule 40 steel pipe which formed an annulus around the lower 5 feet of the reactor. The jacket was closed, filled with Dowtherm A and connected to a vertical water cooled condenser. A safety pressure relief valve set at 175 pounds per square inch was attached to the jacket. A nitrogen pressure pad was used to control the jacket pressure. A vaporizer was utilized for the organic feed material and consisted of an 8 foot steel pipe 2 inches in interial diameter and equipped with a steam jacket operated at 175 pounds per square inch gauge. Air was fed to the system by passage through a steel pre-heater and a 1 inch diameter feed line. Chlorine was mixed downstream from the main feed line through a ½ inch diameter line and finally the vaporized 1,2-dichloroethane was mixed by entering the main line through a ¾ inch diameter line located upstream of the chlorine inlet. The main feed line entered a wind box below the reactor and below the fluidizing gas distributor plate. Air rates were metered with a rotameter as was the chlorine. 1,2-dichloroethane was metered as a liquid through a tri-flat rotameter. The gas distributor plate located in the fluidized bed reactor was constructed of a ⅛ inch thick nickel plate 8½ inches in diameter with 18 holes drilled on a 1 and 11/32 of an inch triangle pitch pattern with a number 54 drill. The pressure drop across the plate for gas velocities in the operating range was about 1½ inches of mercury and the pressure drop across the fluidized bed was in the range of ½ to 1 inch of mercury. An impervious graphite tube and shell condenser with approximately 9 square feet of cooling surface was used as a primary condenser for the product gas stream issuing from the reactor and the condenser was mounted at a slope of 45° to prevent build-up of catalyst blowover. Uncondensed gases and vapors leaving the condenser passed through two cold traps, the first of which was cooled by Dry Ice and the second cooled to −20° to −30° F. In a Dry Ice-acetone cold bath. Gases leaving the second cold trap were passed through a 4 inch diameter glass scrubber with a 4 foot packed height of 1 inch Berl saddles. Water was passed downward countercurrent to the gas stream and was drained from the bottom of the scrubber. The HCl and small amounts of uncondensed organics were scrubbed from the gas stream. Vent gases from the scrubber were vented through a polyvinyl chloride pipe line to the atmosphere above the building. The vent gas volume was measured periodically with a rotameter. Heat required for operating temperatures for start-ups was supplied by 6 strip heaters 750 watts-250 volts connected in parallel around the lower 3 feet of the Dowtherm jacket. Supplementary heaters were placed around the lower 6 inches of the reactor just below the Dowtherm jacket for additional bed temperature control. Temperatures in the bed were measured by thermocouples in the reactor at the distributor plate level, 1 foot above the distributor plate and 3 feet above the distributor plate.

An oxygen pre-heater and a feed line were connected to the reactor at a point 14 inches above the distributor plate.

A catalyst was prepared by dissolving 1,316 grams of $CuCl_2 \cdot 2H_2O$ and 688 grams of KCl in 2,000 milliliters of water. This concentrated active solution was then poured evenly over 10 pounds of suitably sized (30 to 60 mesh) Florex particles (a calcined fuller's earth, manufactured by the Floridin Corporation). The solution contained just enough water to thoroughly wet all the Florex particles. The wet catalyst particles were dried in a steam heated tray drier. The dried catalyst particles have a solids loading of 30.6% by weight of salts which corresponds to 7.5% copper and 5.5% potassium.

The reactor was packed to a depth of 60 inches with the copper chloride and potassium chloride catalyst formed as described above. 1,2-dichloroethane, chlorine, and oxygen as air were fed to the wind box below the distributor plate. The molar ratio of dichloroethane to chlorine to oxygen was 1.0 to 1.0 to 0.1. At the inlet point 14 inches above the distributor plate, 0.9 mole of oxygen was fed for each mole of 1,2-dichloroethane fed to the wind box. The pressure in the reactor was maintained between 5 and 15 pounds per square inch gauge and the bed temperature ranged from between 779° and 796° F. The contact time ranged between 9.5 and 9.7 seconds. The results of these runs are listed below in Table II.

TABLE II.—MOLE PERCENT RECOVERY BASED ON TOTAL ORGANICS FED

| | | |
|---|---|---|
| $C_2HCl_3$ | 13.7 | 20.2 |
| $C_2Cl_4$ | 59.4 | 54.6 |
| $C_2HCl_5$ | 10.9 | 6.3 |
| CO and $CO_2$ | 5.1 | 3.5 |
| $Cl_2$ Utilization, percent | 71.5 | 82.0 |

As can be readily seen, the process conducted in the above manner gives rise to good utilization of feed materials, adequate productivity and a minimum amount of burning.

Similarly, when the process of the instant invention is applied to a process in which fluid beds are employed separately in both the chlorination and oxychlorination steps similar results are obtainable.

While the invention has been described with reference to certain specific examples, it is of course to be understood that this is not to be construed as limitations on the invention except insofar as appears in the accompanying claims.

We claim:

1. In a process of preparing perchloroethylene in a stepwise process involving the vapor phase chlorination of 1,2-dichloroethane in a first step wherein between ¼ to 1.5 moles of chlorine per mole of 1,2-dichloroethane is fed until chlorination of 1,2-dichloroethane occurs and a product of hydrocarbon chloride and HCl are produced, followed by a step of vapor phase catalytic oxychlorination of said product of said chlorination step, said oxychlorination step being conducted at temperature of 720 to 950° F. with oxygen fed thereto at between 0.25 to 5 moles of oxygen per mole of 1,2-dichloroethane fed to said chlorination step, said product and oxygen being present in said oxychlorination step for a period of time sufficient to thereby produce perchloroethylene, the improvement comprising feeding to the reaction of said first step between .025 to 0.1 mole of oxygen per mole of 1,2-dichloroethane to thereby reduce the quantity of carbon deposited in the said oxychlorination step.

2. In a method of preparing perchloroethylene in a stepwise process involving the chlorination of 1,2-dichloroethane in the vapor phase with elemental chlorine in a first step wherein between ¼ to 1.5 moles of chlorine per mole of 1,2-dichloroethane are fed until a chlorination of 1,2-dichloroethane occurs and a product of hydrocarbon chloride and HCl is produced followed by a step fo catalytic oxychlorination of said product of said chlorination step, said oxychlorination step being conducted at temperature of 720 to 950° F. with oxygen fed thereto at between 0.25 to 5 moles of oxygen per mole of 1,2-dichloroethane fed to said chlorination step, said product and oxygen being present in said oxychlorination step for between 4 to 25 seconds or longer to thereby produce perchloroethylene, the improvement comprising feeding to the reaction of said first step between 0.25 to 0.1 mole of oxygen per mole of 1,2-dichloroethane to thereby reduce the quantity of carbon deposited in the said oxychlorination step.

3. In a method of preparing perchloroethylene in a stepwise process involving the vapor phase chlorination of 1,2-dichloroethane at 650 to 750° F. in a first step wherein between ¼ to 1.5 moles of chlorine per mole of 1,2-dichloroethane is fed for a period of time sufficient to produce a product of hydrocarbon chloride and HCl, followed by a step of vapor phase catalytic oxychlorination of said product of said chlorination step, said oxychlorination step being conducted at 720 to 950° F. with oxygen fed thereto at between 0.25 to 5 moles of oxygen per mole of 1,2-dichloroethane fed to said chlorination step, said product and oxygen being present in said oxychlorination step for a period of time sufficient to thereby produce perchloroethylene, the improvement comprising feeding to the reaction of said first step between .025 to 0.1 mole of oxygen per mole of 1,2-dichloroethane to thereby reduce the quantity of carbon deposited in the said oxychlorination step.

4. In a method of preparing perchloroethylene in a stepwise process involving the chlorination of 1,2-dichloroethane in the vapor phase at 650 to 750° F. with elemental chlorine in a first step wherein between ¼ to 1.5 moles of chlorine per mole of 1,2-dichloroethane are fed until chlorination of 1,2-dichloroethane occurs and a product of hydrocarbon chloride and HCl is produced followed by a step of catalytic oxychlorination of said product of said chlorination step, said oxychlorination step being conducted at temperature of 720 to 950° F. with oxygen fed thereto at between 0.25 to 5 moles of oxygen per mole of 1,2-dichloroethane fed to said chlorination step, said product and oxygen being present in said oxychlorination step for between 4 to 25 seconds or longer to thereby produce perchloroethylene, the improvement comprising feeding to the reaction of said first step between .025 to 0.1 mole of oxygen per mole of 1,2-dichloroethane to thereby reduce the quantity of carbon deposited in the said oxychlorination step.

5. In a method of preparing perchloroethylene in a stepwise process involving:
(a) contacting 1,2-dichloroethane and elemental chlorine in the vapor phase in a chlorination zone operated at 650° F. to 750° F., there being fed to said zone between ¼ to 1.5 moles of chlorine per mole of 1,2-dichloroethane at a contact time in said zone of 0.25 to 5 seconds to thereby produce a product stream of hydrocarbon chloride and HCl, and
(b) feeding said product stream to an oxychlorination catalyst zone with oxygen, said oxychlorination catalyst zone being operated at 720° F. to 950° F., the oxygen fed thereto being between 0.25 to 5 moles of oxygen per mole of 1,2-dichloroethane fed to said chlorination zone, and a contact time of between 4 to 25 seconds being used in said oxychlorination catalyst zone to thereby produce perchloroethylene, the improvement comprising feeding to the reaction of step (a) between 0.025 and 0.1 mole of oxygen per mole of 1,2-dichloroethane to thereby reduce the quantity of carbon deposited in step (b).

References Cited

UNITED STATES PATENTS

| | | | |
|---|---|---|---|
| 1,591,984 | 7/1926 | Krause et al. | 260—662 |
| 2,140,548 | 12/1938 | Reilly. | |
| 2,334,033 | 11/1943 | Riblett | 260—662 |
| 2,379,414 | 7/1945 | Cass | 260—654 |
| 2,838,577 | 6/1958 | Cook et al. | 260—656 |
| 2,957,924 | 10/1960 | Heiskell et al. | 260—662 |
| 2,374,923 | 5/1945 | Cass | 260—654 |

LEON ZITVER, *Primary Examiner.*

T. G. DILLAHUNTY, *Assistant Examiner.*

U.S. Cl. X.R.

260—658, 659, 662

UNITED STATES PATENT OFFICE
CERTIFICATE OF CORRECTION

Patent No. 3,449,450            June 10, 1969

Lester E. Bohl et al.

It is certified that error appears in the above identified patent and that said Letters Patent are hereby corrected as shown below:

Column 12, list of References Cited, add the following references:

| | | |
|---|---|---|
| 2,278,527 | 4/1942 | Rust et al. ------260-654 |
| 2,636,864 | 4/1953 | Pye et al. ------252-441 |
| 2,746,844 | 5/1956 | Johnson et al. --- 23-219 |

Signed and sealed this 7th day of October 1969.

(SEAL)
Attest:

Edward M. Fletcher, Jr.

Attesting Officer

WILLIAM E. SCHUYLER, JR.

Commissioner of Patents